United States Patent
Hayslett et al.

(10) Patent No.: US 9,802,673 B2
(45) Date of Patent: Oct. 31, 2017

(54) ELECTRIC BIKE POWERTRAIN WITH DUAL PLANETARY GEAR SETS AND RING GEAR PEDAL REACTION TORQUE MEASUREMENT

(71) Applicant: GM Global Technology Operations LLC, Detroit, MI (US)

(72) Inventors: Steven L. Hayslett, Troy, MI (US); Shawn H. Swales, Canton, MI (US); Richard J. Lannen, Royal Oak, MI (US); Jussi A. Timonen, Los Angeles, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 135 days.

(21) Appl. No.: 14/714,495

(22) Filed: May 18, 2015

(65) Prior Publication Data
US 2016/0339993 A1     Nov. 24, 2016

(51) Int. Cl.
*B62M 6/55* (2010.01)
*B62M 11/18* (2006.01)
*B62M 11/14* (2006.01)

(52) U.S. Cl.
CPC ............ *B62M 6/55* (2013.01); *B62M 11/145* (2013.01); *B62M 11/18* (2013.01)

(58) Field of Classification Search
None
See application file for complete search history.

(56) References Cited

U.S. PATENT DOCUMENTS

| | | | |
|---|---|---|---|
| 6,354,980 B1 * | 3/2002 | Grant | B62M 11/16 280/238 |
| 6,607,465 B1 * | 8/2003 | Shoge | B62M 11/16 475/297 |
| 6,672,418 B1 * | 1/2004 | Makino | B62M 6/45 180/206.3 |
| 2010/0170731 A1 * | 7/2010 | Jordan | B62M 6/65 180/65.7 |
| 2011/0303474 A1 * | 12/2011 | Kimmich | B62M 9/04 180/206.3 |
| 2012/0097467 A1 * | 4/2012 | Maeno | B62M 6/55 180/206.7 |
| 2012/0313461 A1 * | 12/2012 | Takeuchi | H02K 1/278 310/43 |
| 2014/0080651 A1 * | 3/2014 | Kim, II | F16H 1/28 475/149 |
| 2014/0221151 A1 * | 8/2014 | Hino | B62M 6/55 477/5 |
| 2016/0068223 A1 * | 3/2016 | Zanfei | B62M 6/50 301/6.5 |
| 2016/0332696 A1 * | 11/2016 | Spaggiari | B62M 6/55 |

FOREIGN PATENT DOCUMENTS

| | | | | |
|---|---|---|---|---|
| EP | 0216040 A2 * | 4/1987 | | G01L 3/1471 |
| JP | 10119873 A * | 5/1998 | | |

* cited by examiner

*Primary Examiner* — Lori Wu
(74) *Attorney, Agent, or Firm* — BrooksGroup (57) ABSTRACT

A number of variations may include an electric cycle powertrain having a first planetary gear set and a second planetary gear set, wherein the second planetary gear set is constructed and arranged to selectively overdrive a pedal cadence and wherein the first planetary gear set is constructed and arranged to selectively provide additional gear ratio for a motor.

20 Claims, 7 Drawing Sheets

ELECTRIC BIKE POWERTRAIN WITH DUAL PLANETARY GEAR SETS AND RING GEAR PEDAL REACTION TORQUE MEASUREMENT

TECHNICAL FIELD

The field to which the disclosure generally relates to includes electric cycles having pedal force-based propulsion systems.

SUMMARY OF ILLUSTRATIVE VARIATIONS

A number of variations may include an electric cycle powertrain having a first planetary gear set and a second planetary gear set, wherein the second planetary gear set is constructed and arranged to selectively overdrive a pedal cadence and wherein the first planetary gear set is constructed and arranged to selectively provide additional gear ratio for a motor.

A number of variations may include an electric cycle comprising: a crankshaft; a first pedal assembly and a second pedal assembly operatively connected to the crankshaft; a chain ring operatively connected to the crankshaft; a chain operatively connected to the chain ring; a rear sprocket operatively connected to the chain and a rear hub; a motor comprising a stator and a rotor operatively connected to the crankshaft; a battery pack adjacent to and operatively connected to the motor; a first planetary gear set operatively connected to the motor, wherein the first planetary gear set is constructed and arranged to selectively provide additional gear ratio for the motor; and a second planetary gear set operatively connected to the first pedal assembly and the second pedal assembly, and wherein the second planetary gear set is constructed and arranged to selectively overdrive a pedal cadence.

A number of variations may include an electric cycle powertrain comprising a motor and at least one gear set, wherein the at least one gear set is constructed and arranged to be located within the motor to allow the motor to be efficiently cooled.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
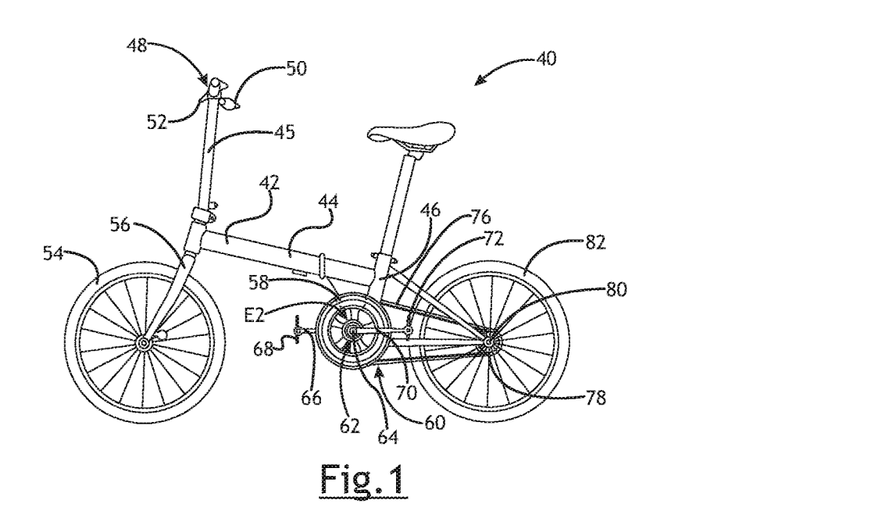
FIG. 1 illustrates an electric cycle according to a number of variations.
Figure 2:
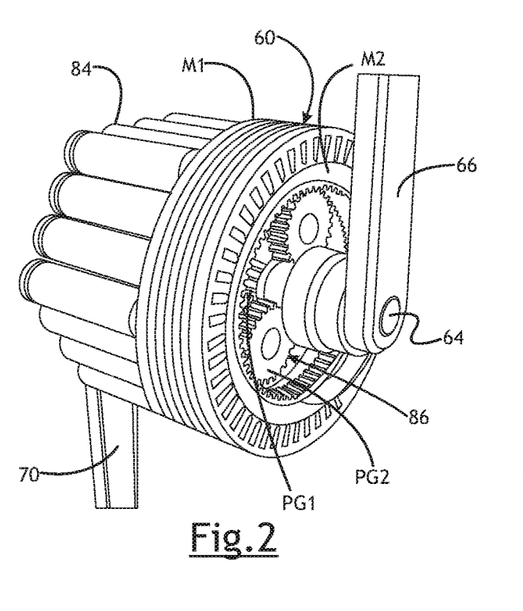
FIG. 2 illustrates a perspective view of an electric cycle powertrain according to a number of variations.
Figure 3:
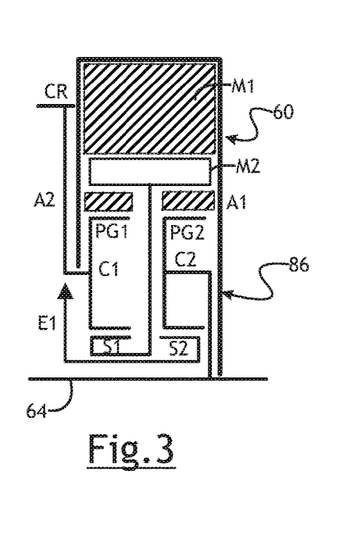
FIG. 3 illustrates a schematic of an electric cycle powertrain according to a number of variations.

FIG. 1 illustrates a number of variations which may include an electric cycle 40. In any of a number of variations, the electric cycle 40 may include a frame 42 which may include a top tube 44 connected to a seat tube 46. A steerer tube 45 may extend from the top tube 44. The steerer tube 45 may be operatively connected to a front fork 56 which may be attached to a front wheel 54. Handlebars 48 may be attached to the steerer tube 45 and may be used to control the direction of the front wheel 54 by way of the front fork 56. Control levers 50 may be provided on the handlebars 48 and may be constructed and arranged to communicate with one or more electronic control devices 58, one or more mechanical mechanism E1, E2, E3, E4, and/or the motor 60, as will be discussed hereafter. The one or more electronic control devices 58 may include electronic processing components to receive input signals and to send out signals to control various components of the electric cycle 40, which may include sending output signals to control operation of the electric motor 60. In a number of variations the one or more electronic control devices 58 may include memory, a processor and software and/or hardware to process input signals and generate output signals, and may include formulas, lookup tables or other means for comparing and processing data. A brake lever 52 may also be provided on the handlebars 48, if desired.

The electric cycle 40 may also include a crank assembly 62 which may include a crankshaft 64 having a first pedal assembly 66 and a second pedal assembly 70 connected thereto. The first pedal assembly 66 may include a first foot pedal 68, and the second pedal assembly 70 may include a second foot pedal 72. A chain ring or sprocket CR may be operatively connected to the crankshaft 64 for driving a chain 76 operatively connected to a rear sprocket 78 which may be operatively connected to a rear hub 80 of a rear wheel 82.

The electric cycle 40 may be constructed and arranged to allow a rider to rotate a first and second pedal assembly 66, 70 in a full clockwise or counter clockwise rotation to power the electric cycle 40 or may allow a rider to use a pedal force-based propulsion system wherein the first and second pedal assemblies 66, 70 may be fixed in an approximately horizontal position so that a rider may provide intuitive input commands by applying a force to a first foot pedal 68 attached to the first pedal assembly 66 or a second foot pedal 72 attached to the second pedal assembly 70 in the clockwise or counter clockwise direction. The input commands are intuitive to the rider and may be similar to riding a non-motorize cycle wherein the rider applies a clockwise force to a cycle crank by applying force to a forward positioned foot pedal to move the cycle in a forward direction, and the rider applies a counter clockwise force to the cycle crank by applying force to a rearward positioned foot pedal to slow the cycle.

Reference herein as to clockwise or counter-clockwise is made with respect to the right hand side of the cycle with an operator facing the forward direction of movement of the electric cycle 40.

The electric cycle 40 may be a bicycle, tricycle, or four-wheel electric cycle having a crank assembly 62 constructed and arranged to allow a rider to provide input thereto using the first pedal assembly 66 and the second pedal assembly 70.

Figures 4, 5, 6:
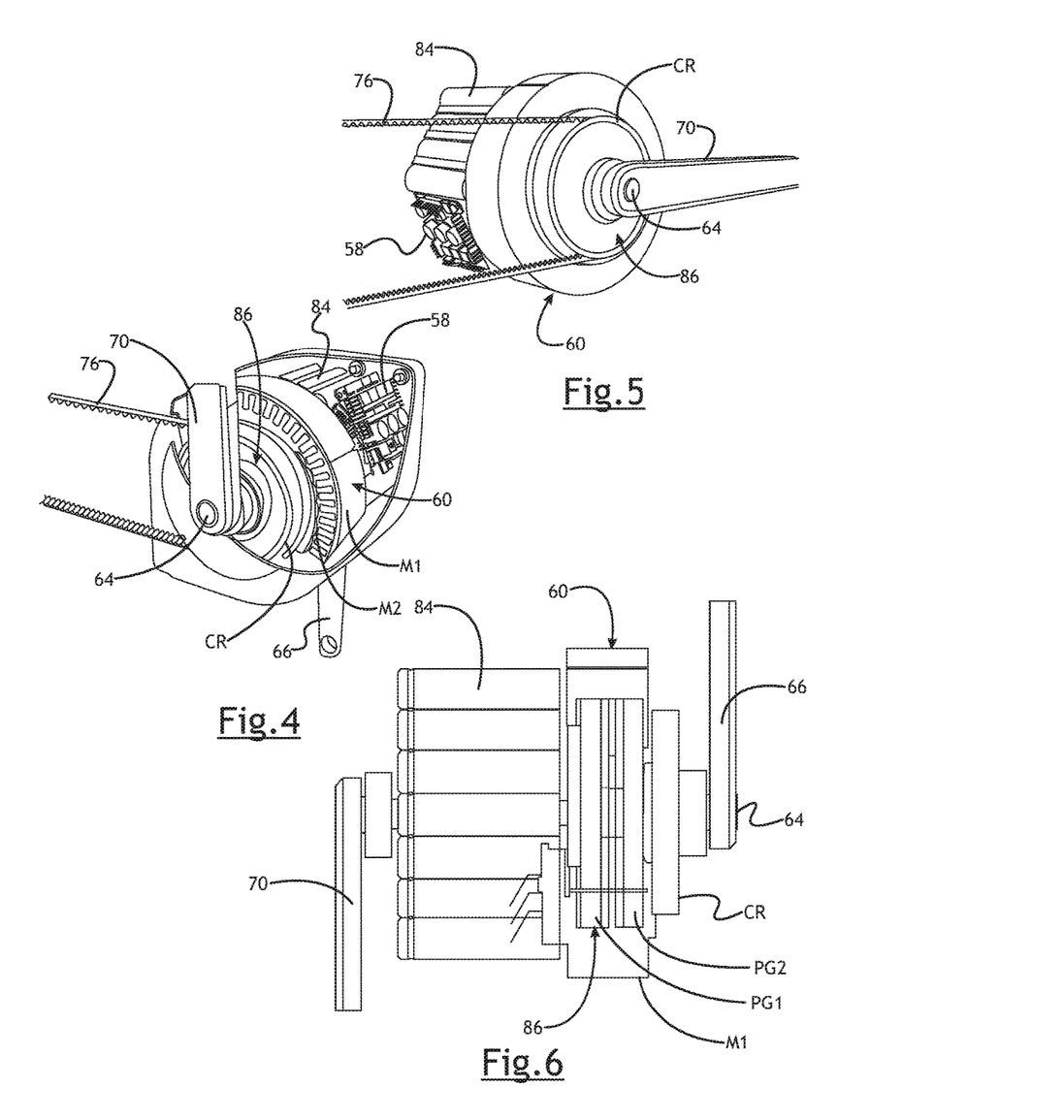
FIG. 4 illustrates a perspective view of an electric cycle powertrain with sections removed according to a number of variations.
FIG. 5 illustrates a perspective view of an electric cycle powertrain with sections removed according to a number of variations.
FIG. 6 illustrates a rear view of an electric cycle powertrain according to a number of variations.

Referring to FIGS. 2-6, in a number of variations, an electric cycle 40 may include an electric motor/generator 60 which may be used to propel the electric cycle 40 forward and to generate electricity from motor/generator braking. The motor/generator 60 may be attached to the electric cycle 40 frame 42 adjacent the pedal assemblies 66, 70, chain ring CR (or belt ring), and/or crankshaft 64. The motor/generator 60 may include any of a number of types of motor/generators including, but not limited to, a brushless in runner ring motor. The motor 60 may include a stator M1 and a rotor M2. The rotor M2 may rotate within the stator M1 which may be grounded. The motor 60 may be powered by any number of battery assemblies 84. In one variation, a plurality of batteries 84 may be arranged in a circular pattern adjacent to the motor 60. This may allow the motor 60 and the batteries 84 to be isolated from each other which may reduce or eliminate heat transfer issues of the motor 60 and the batteries 84. In a number of variations, one or more electronic control devices 58 may be positioned within and/or along the one or more battery assemblies 84, a variation of which is illustrated in FIG. 4, and may be used to control the operation of the electric cycle 40. In a number of variations, one or more gear sets may be located within the motor 60 and may allow the motor 60 to be efficiently cooled. In one variation, a first planetary gear set PG1 and a second planetary gear set PG2 may be located within the motor 60. In a number of variations, the first planetary gear set PG1 may be operatively connected to the motor 60 and may be used to provide additional gear ratio to the motor 60, and the second planetary gear set PG2 may be operatively connected to the first and second pedal assemblies 66, 70 and may be used to overdrive pedal cadence. This arrangement of the electronic cycle powertrain 86 may reduce the packaging space required for the powertrain 86, a variation of which is illustrated in FIG. 6.

Figure 11:
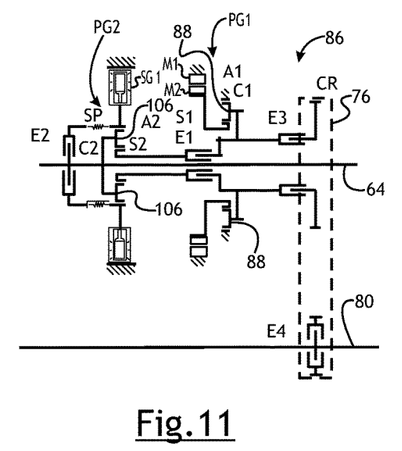
FIG. 11 illustrates a schematic of an electric cycle powertrain according to a number of variations.

Referring to FIG. 11, in a number of variations, the first planetary gear set PG1 may include a first sun gear S1 which may be operatively attached to one or more first planetary gears 88 so that when the first sun gear S1 is rotated, the first sun gear S1 causes the one or more first planetary gears 88 to rotate within a first ring gear A1 which may be grounded. In a number of variations, the one or more first planetary gears 88 may be operatively connected to a first carrier C1 and may cause the first carrier C1 to rotate when the one or more first planetary gears 88 may be rotated. The first carrier C1 may be operatively connected to a chain ring CR which may drive a rear sprocket 78 of a rear wheel 82. In a number of variations, the first sun gear S1 may be operatively attached to the rotor M2 of the motor 60 and may be driven by the rotor M2. This may allow for high speed input from the motor 60.

In a number of variations, a first mechanical mechanism E1 may be operatively attached to the first and second pedal assemblies 66, 70. The first mechanical mechanism E1 may be constructed and arranged so that when the first mechanical mechanism E1 is closed, torque to the rear hub 80 is generated by rotation of the first and second pedal assemblies 66, 70 and when the first mechanical mechanism E1 is open, torque to the rear hub 80 comes from only the motor 60. In this arrangement, a third mechanical mechanism E3, as discussed below, is closed.

In a number of variations, the second planetary gear set PG2 may include a second carrier C2 which may be operatively attached to one or more second planetary gears 106 so that when the second carrier C2 is rotated, the second carrier C2 causes the one or more second planetary gears 106 to rotate within a second ring gear A2, which may be grounded. In a number of variations, the one or more second planetary gears 106 may be operatively connected to a second sun gear S2 and may cause the second sun gear S2 to rotate when the one or more second planetary gears 106 may be rotated. In a number of variations, the second carrier C2 may be operatively attached to the crankshaft 64 which may be operatively connected to the first pedal assembly 66 and the second pedal assembly 70. In a number of variations, the second ring gear A2 may be operatively connected to a second mechanical mechanism E2 which may be of any type suitable to provide at least one of the following: (1) allowing for the free rotation of the first and second pedal assemblies 66, 70 in both the clockwise and counterclockwise directions; (2) locking the first and second pedal assemblies 66, 70 and preventing rotation in both the clockwise and counterclockwise directions; (3) locking the first and second pedal assemblies 66, 70 preventing movement in the clockwise direction and allowing rotation in the counterclockwise direction; or (4) locking the first and second pedal assemblies 66, 70 preventing rotation in the counterclockwise direction but allowing rotation in the clockwise direction.

Referring to FIGS. 7-10, in a number of variations, the second mechanical mechanism E2 may include a base plate 90 having a plurality of tabs 92, 94 (first tab 92 and second tab 94, or first set of tabs 92 and second set of tabs 94) pivotally connected thereto. A spring 96 may be provided for each tab 92, 94. The spring 96 may be connected to a tab 92, 94 and to the base plate 90 to bias the tab 92, 94 in one direction. A solenoid or servo may be provided having a shaft or piston 98 that may be selectively moved out of an overlying position with respect to one of the tabs 92, 94 so that the spring 96 biases that tab 92, 94 upward and the tab 92, 94 engages a shoulder 102 of a cap 100. The cap 100 may lie over the base plate 90. The cap 100 may be operatively connected to the crankshaft 64. The cap 100 may have a plurality of recesses 104 formed therein defined by features in the cap 100 so that each of the plurality of recesses 104 is defined in part by a shoulder 102 against which the tabs 92, 94 may lock and prevent rotation of the cap 100 in one direction and/or the other direction. The cap 100 may be operatively tied to the crankshaft 64 to allow or prevent rotation of the same. The second mechanical mechanism E2 may, in a number of variations, be solenoid or servo controlled, causing the tabs 92, 94 to move into or out of locking position with respect to the shoulder 102 of the recesses 104 formed in the cap 100.

Figure 7:
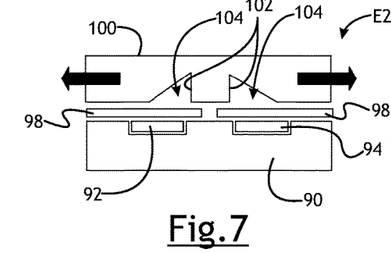
FIG. 7 illustrates a mechanical mechanism according to a number of variations.

FIG. 7 illustrates a schematic of a second mechanical mechanism E2 with the tabs 92, 94 in a retracted position with respect to the base plate 90 so that the cap 100, which is tied to the crankshaft 64, is free to rotate in both the clockwise and counterclockwise directions.

Figure 8:
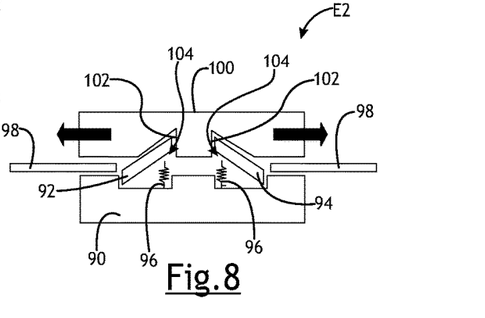
FIG. 8 illustrates a mechanical mechanism according to a number of variations.

FIG. 8 illustrates a schematic of a second mechanical mechanism E2 wherein the first tab 92 (or first set of tabs 92) and the second tab 94 (or second set of tabs 94) are in an elevated position so that they engage a shoulder 102 formed in the cap 100, which is tied to the crankshaft 64, thereby preventing movement of the cap 100 and the crankshaft 64 in both the clockwise and counterclockwise directions.

Figure 9:
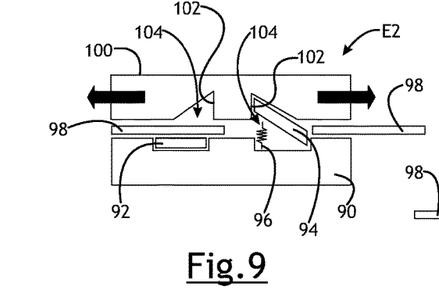
FIG. 9 illustrates a mechanical mechanism according to a number of variations.

FIG. 9 illustrates a schematic of a second mechanical mechanism E2 wherein the second tab 94 (or second set of tabs 94) is in an elevated position with respect to the base plate 90 and so that the second tab 94 engages a shoulder 102 formed in the cap 100 preventing clockwise movement of the cap 100 and the crankshaft 64. However, the first tab 92 (or first set of tabs 92) is in a retracted position with respect to the base plate 90 and does not engage a shoulder 102 and thereby allows counterclockwise movement of the cap 100 and the crankshaft 64 tied thereto.

Figure 10:
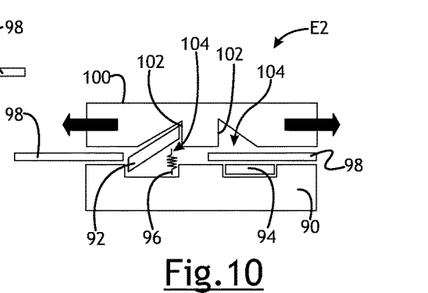
FIG. 10 illustrates a mechanical mechanism according to a number of variations.

FIG. 10 illustrates a schematic of a second mechanical mechanism E2 wherein the first tab 92 (or first set of tabs 92) is in an elevated position with respect to the base plate 90 and so that the first tab 92 engages a shoulder 102 of the cap 100, preventing counterclockwise movement of the cap 100 and the crankshaft 64 tied thereto. However, the second tab 94 (or second set of tabs 94) is in a retracted position with respect to the base plate 90 and does not engage a shoulder 102 of the cap 100, thereby allowing clockwise rotation of the cap 100 and of the crankshaft 64 tied thereto.

Referring again to FIG. 11, in a number of variations, a third mechanical mechanism E3 may be operatively connected to the chain ring CR and may be constructed and arranged so that when the third mechanical mechanism E3 is closed, torque from the crankshaft 64 is transferred to the chain ring CR to drive the rear hub 80 and when the third mechanical mechanism E3 is open, the chain ring CR is disconnected from the crankshaft 64 so that the chain ring CR no longer spins allowing the rear hub 80 to spin freely. A fourth mechanical mechanism E4 may be operatively attached to the rear hub 80 and may be constructed and arranged to connect or disconnect torque input from the chain ring CR to the rear hub 80. When the fourth mechanical mechanism E4 is closed, the rear hub 80 may be operatively connected to the rear sprocket 78 so that torque from the chain ring CR drives the rear hub 80 and when the fourth mechanical mechanism E4 is open, the rear hub 80 is disconnected from the rear sprocket 78 allowing the rear hub 80 and rear wheel 82 to coast freely.

The electric cycle powertrain 86 may also include a spring SP which may be operatively connected to the second planetary gear drive PG2 which may absorb static abuse and may provide a rider with proportional feel.

In a number of variations, a means for measuring torque SG1 including, but not limited to, a strain gage, may also be operatively connected to the second planetary gear set PG2 and may be used to measure the reaction torque from the pedal input. The means for measuring torque SG1 may be placed on the second ring gear A2 and may measure the reaction torque of the second ring gear A2 which may be proportional to the rider input torque. The means for measuring torque SG1 may be used to control the operation of at least one of the electric motor 60 or a regenerative braking system in the electric motor 60. The positioning of the means for measuring torque SG1 being operatively connected to second ring gear A2 may reduce packaging space.

The electric cycle 40 may be constructed and arranged to selectively provide for at least one of the following functions or modes: (A) Pedal assist, wherein the torque (and optionally the speed, position, and direction of the crank) is detected and assistance in rotating the crankshaft 64 is provided by the electric motor 60 in response to the detected torque, (and optionally the speed and direction of the crankshaft 64); (B) Coast with spinning motor 60 synchronized with the road, wherein the crankshaft 64 is de-coupled to the electric motor and the rider is not rotating the pedal assemblies 66, 70 of the electric cycle 40, but the wheels 54, 82 and motor 60 are spinning; (C) Coast without spinning motor synchronized with the road, wherein the crankshaft 64 is not coupled to the motor 60 and the motor 60 is not coupled to the chain ring CR; (D1) Electronic coaster with regenerative braking mode, wherein the first and second pedals assemblies 66, 70 are locked from rotating and the crankshaft 64 is de-coupled from the electric motor 60, and the rider may apply a backward force to the first or second foot pedal 68, 72 so that the means for measuring torque SG1 measures the reaction torque and causes a regenerative braking command to be sent to the motor 60 to generate energy which may be fed back into the battery pack 84 increasing the efficiency and range of the battery pack 84; (D2) Regenerative braking mode, wherein the motor 60 slows down the electric cycle 40 while a regenerative braking command may be sent to the motor 60 to generate energy which may be fed back into the battery pack 84 which increases the efficiency of the battery pack 84 and increases the range of the battery pack 84; (E) Pedal force throttle mode, wherein the clockwise torque/force of the crankshaft 64 is measured when the second mechanical mechanism E2 is locked and wherein the force applied on a forward pedal by the rider is detected and used as a throttle input to the motor 60; (F) Pedal mode without back drive lockup, wherein the rider may rotate the crankshaft 64 in a clockwise direction to move the electric cycle 40 forward, and the rider may rotate the crankshaft 64 in a counter clockwise direction in a free spinning mode without back drive lockup or locking the rear wheel 82 when moving backwards; or (G) Security lock mode, wherein the first and second pedal assemblies 66, 70 may not be rotated clockwise or counterclockwise but the electric cycle 40 may be rolled.

Figure 12:
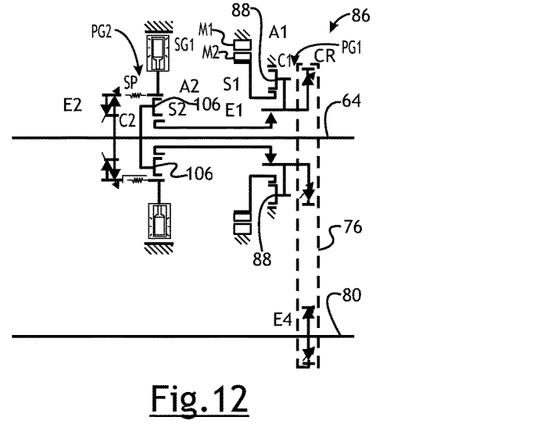
FIG. 12 illustrates a schematic of an electric cycle powertrain according to a number of variations.

FIG. 12 illustrates a schematic illustration of a general arrangement for an electric cycle 40 as illustrated in FIG. 11 wherein the first, second, third, and fourth mechanical mechanisms E1, E2, E3, E4 are each selectable one way clutches according to a number of variations.

Chart 1 below illustrates six various states (States 1-7) for an electric cycle 40 to achieve the one or more functions or modes A-G discussed above. The chart identifies the operating conditions for E1-E4 according to a number of variations.

CHART 1

| State | Mode(s) | Power | E1 | | E2 | | E3 | | E4 | |
|---|---|---|---|---|---|---|---|---|---|---|
| | | | FWD | REV | FWD | REV | FWD | REV | FWD | REV |
| 1 | B, D1, D2, E | ON | OWC: locked | open | locked | locked | locked | locked | locked | locked |
| 2 | A, B, D1, D2 | ON | OWC: locked | open | open | OWC: locked | locked | locked | locked | locked |
| 3 | A, B, D2, F | ON | OWC: locked | open | open | open | locked | locked | locked | locked |
| 4 | A, C, F | ON | OWC: hacked | open | open | open | locked | locked | open | OCW, locked |
| 5 | A, C, F | ON | OWC: locked | open | open | open | OWC: locked | open | locked | locked |
| 6 | G | OFF | n/a | n/a | locked | locked | n/a | n/a | n/a | n/a |
| 7 | A, B, F | ON | OWC; locked | open | n/a | n/a | *moved to new location, locked | open | n/a | n/a |

Figure 13:
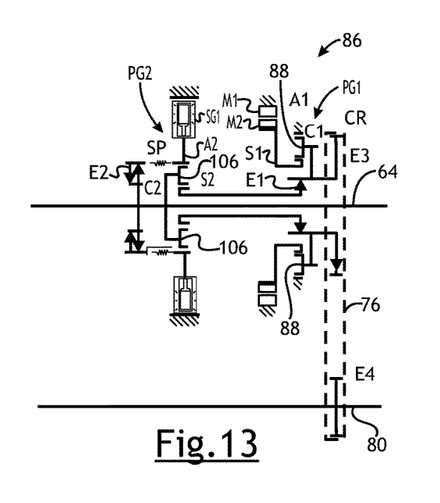
FIG. 13 illustrates a schematic of an electric cycle powertrain according to a number of variations.
Figure 14:
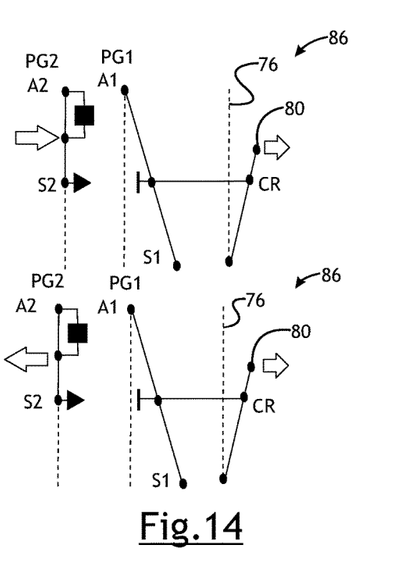
FIG. 14 illustrates lever diagrams for an electric cycle powertrain according to a number of variations.

FIGS. 13 and 14 illustrate a schematic and lever diagrams for an electric cycle powertrain 86 constructed and arranged to achieve State 1, identified in Chart 1. State 1 may allow the electric cycle 40 to function or operate in the following modes: (B) Coast with spinning motor synchronized with the road; (D1) Electronic coasting/regeneration; (D2) Regeneration; and (E) Pedal force throttle. In State 1, the power to the motor 60 is ON. The first mechanical mechanism E1 may be a one-way clutch E1 which may be closed so that the torque to the rear hub 80 is supplied by the motor 60. In State 1, the second mechanical mechanism E2 may be arranged so that the first and second pedal assemblies 66, 70 are locked so that they are prevented from rotating in both a clockwise/forward direction and a counter clockwise/backward direction. The rider may coast, may apply a forward force to the forward pedal 68, 72 to control the speed of the electric cycle 40, or may apply a counterclockwise/backward force to the rearward pedal 68, 72 to send a command to the motor 60 for regenerative braking.

Figure 15:
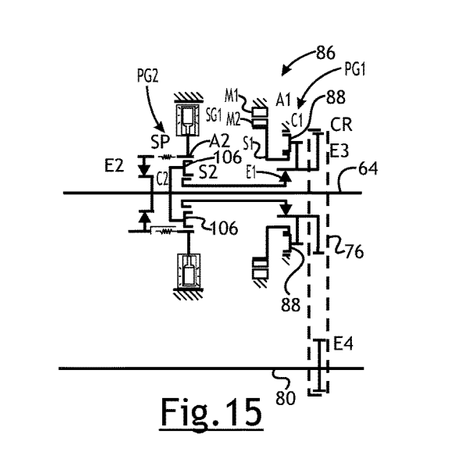
FIG. 15 illustrates a schematic of an electric cycle powertrain according to a number of variations.
Figure 16:
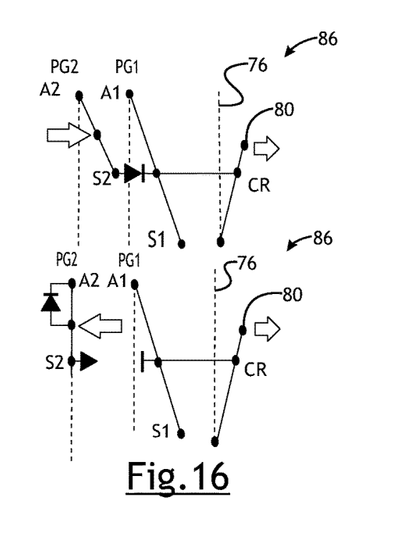
FIG. 16 illustrates lever diagrams for an electric cycle powertrain according to a number of variations.

FIGS. 15-16 illustrate a schematic and lever diagrams of an electric cycle powertrain 86 constructed and arranged to achieve State 2, identified in Chart 1. State 2 may allow the electric cycle 40 to operate in the following modes: (A) Pedal assist; (B) Coast with spinning motor synchronized with the road; (D1) Electronic coasting/regeneration; and (D2) Regeneration. In State 2, the power to the motor 60 may be ON. The first mechanical mechanism E1 may be a one-way clutch which may be open so that torque to the rear hub 80 is supplied by the motor 60. The second mechanical mechanism E2 may be a one-way clutch and may be arranged so that the rider may rotate the first and/or second pedal assemblies 66, 70 in a clockwise/forward direction but are prevented from rotating in a counterclockwise or backward direction. This may allow a rider to coast, to provide additional gear ratio to the motor 60 by rotating the first and second pedal assemblies 66, 70 in a clockwise/forward direction, or to activate regenerative braking by applying a backward force to the first or second pedal assembly 66, 70.

Figure 17:
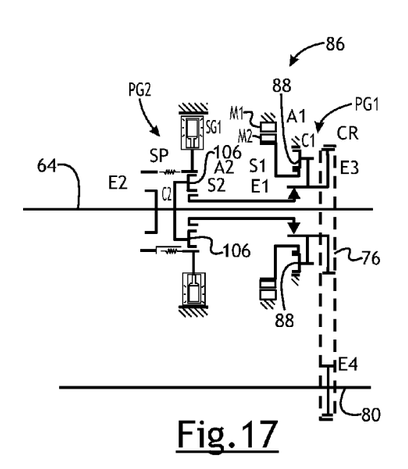
FIG. 17 illustrates a schematic of an electric cycle powertrain according to a number of variations.
Figure 18:
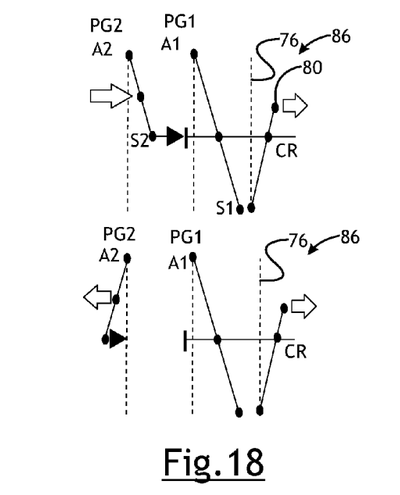
FIG. 18 illustrates lever diagrams for an electric cycle powertrain according to a number of variations.

FIGS. 17 and 18 illustrate a schematic and lever diagrams for an electric cycle powertrain 86 constructed and arranged to achieve State 3, identified in Chart 1. State 3 may allow for the electric cycle 40 to operate in the following modes: (A) Pedal assist; (B) Coast with spinning motor synchronized with the road; (D2) Regeneration; and (F) Pedal mode without back drive lockup. In State 3, the power to the motor 60 is ON. The first mechanical mechanism E1 may be a one-way clutch E1 which may be closed so that torque to the rear hub 80 is supplied by the motor 60. In State 3, the second mechanical mechanism E2 may be arranged so that the first and second pedals assemblies 66, 70 may rotate in both a clockwise/forward direction and a counter clockwise/backward direction. This may allow a rider to coast and allows for rotation of the first and second pedal assemblies 66, 70 in a counterclockwise/backward direction without back drive lockup.

Figure 19:
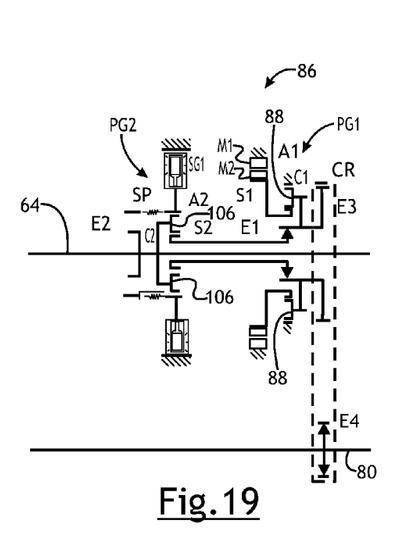
FIG. 19 illustrates a schematic of an electric cycle powertrain according to a number of variations.
Figure 20:
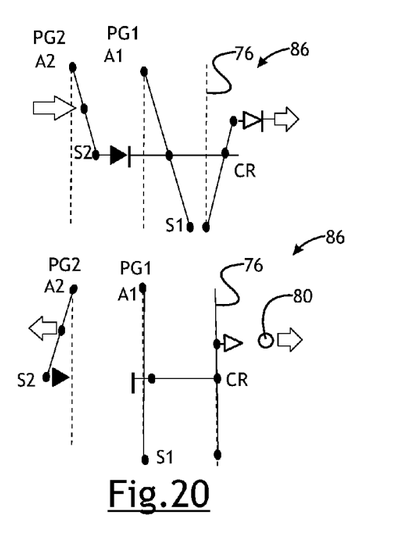
FIG. 20 illustrates lever diagrams for an electric cycle powertrain according to a number of variations.

FIGS. 19 and 20 illustrate a schematic and lever diagrams of an electric cycle powertrain 86 constructed and arranged to achieve State 4, identified in Chart 1. State 4 may allow the electric cycle 40 to operate in the following modes: (A) Pedal assist; (C) Coast without spinning motor synchronized with the road (i.e. motor is not synchronized with the road); and (F) Pedal mode without back drive lockup. In State 4, the power to the motor 60 is ON. The first mechanical mechanism E1 may be a one-way clutch E1 which may be closed so that torque to the rear hub 80 is supplied by the motor 60. In State 4, the second mechanical mechanism E2 may be arranged so that the first and second pedal assemblies 66, 70 may rotate in both a clockwise/forward direction and a counter clockwise/backward direction. This may allow a rider to coast. The fourth mechanical mechanism E4 may be a one-way clutch commonly referred to as a freewheel clutch, which may be open to disconnect the rear hub 80 from receiving torque from the chain ring CR when the rider is pedaling at least one of the first or second pedal assemblies 66, 70 in a counterclockwise/backward direction so that the rear hub 80 may freely coast without back drive lockup.

Figure 21:
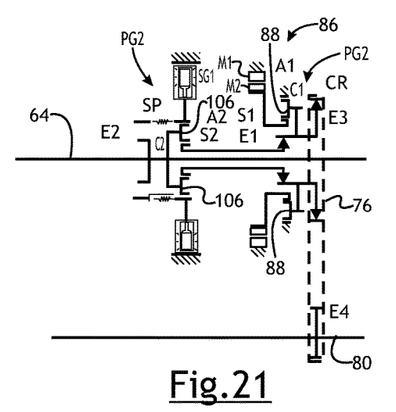
FIG. 21 illustrates a schematic of an electric cycle powertrain according to a number of variations.
Figure 22:
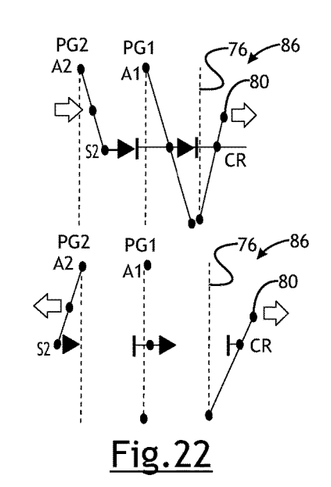
FIG. 22 illustrates lever diagrams for an electric cycle powertrain according to a number of variations.

FIGS. 21 and 22 illustrate a schematic and lever diagrams of an electric cycle powertrain 86 constructed and arrange to achieve State 5, identified in Chart 1. State 5 may allow the electric cycle 40 to operate in the following modes: (A)

Pedal assist; (C) Coast without spinning motor synchronized with the road (i.e. motor is not synchronized with the road); and (F) Pedal mode without back drive lockup. In State 5, the power to the motor 60 is ON. The first mechanical mechanism E1 may be a one-way clutch E1 which may be closed so that torque to the rear hub 80 is supplied by the motor 60. In State 3, the second mechanical mechanism E2 may be arranged so that the first and second pedal assemblies 66, 70 may rotate in both a clockwise/forward direction and a counter clockwise/backward direction. This may allow a rider to coast or to pedal in a counterclockwise/backward direction. The third mechanical mechanism E3 may be a one-way clutch which may be open, disconnecting the chain ring CR from receiving torque from the rear hub 80 to reduce spin losses when coasting.

Figure 23:
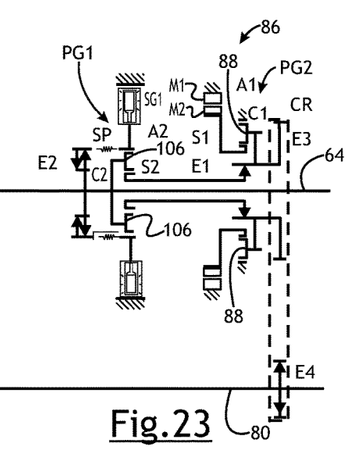
FIG. 23 illustrates a schematic of an electric cycle powertrain according to a number of variations.
Figure 24:
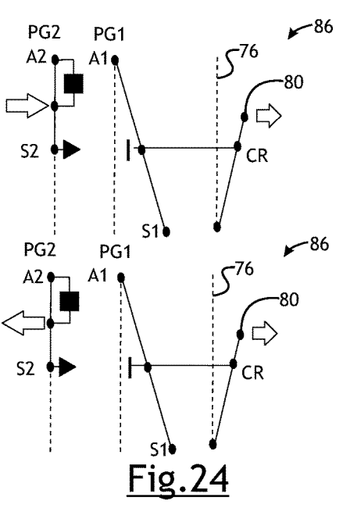
FIG. 24 illustrates lever diagrams for an electric cycle powertrain according to a number of variations.

FIGS. 23 and 24 illustrate a schematic and lever diagrams of an electric cycle powertrain 86 constructed and arranged to achieve State 6, identified in Chart 1. State 6 may allow the electric cycle 40 to function in mode (G) Security lock. In State 6, the power to the motor 60 is OFF and the second mechanical mechanism E2 may be arranged so that the first and second pedal assemblies 66, 70 may be locked so that they cannot be rotated. In State 6, the front and rear wheel(s) 54, 82 may rotate so that the electric cycle 40 may be rolled.

Figure 25:
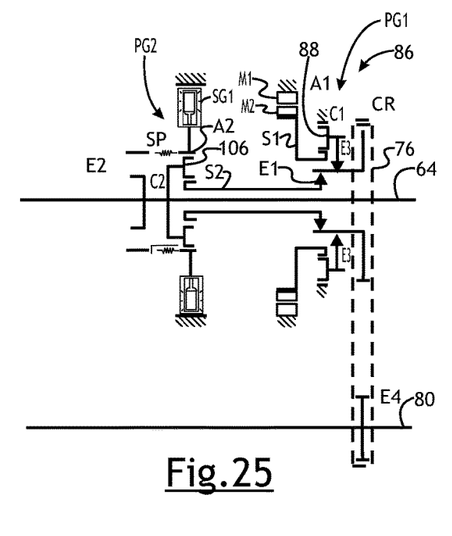
FIG. 25 illustrates a schematic of an electric cycle powertrain according to a number of variations.
Figure 26:
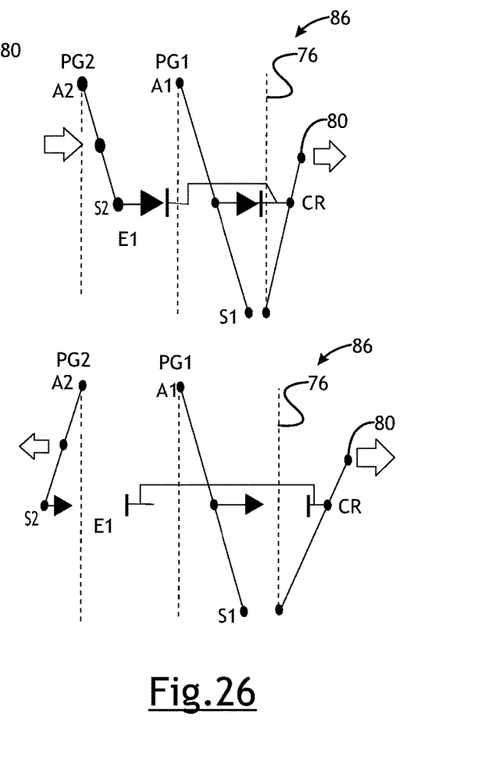
FIG. 26 illustrates lever diagrams for an electric cycle powertrain according to a number of variations.

FIGS. 25 and 26 illustrate a schematic and lever diagrams of an electric cycle powertrain 86 constructed and arranged to achieve State 7, identified in Chart 1. State 7 may allow the electric cycle 40 to operate in the following modes: (A) Pedal assist; (B) Coast with spinning motor synchronized with the road; and (F) Pedal mode without back drive lockup. In State 7, the power to the motor 60 is ON. The first mechanical mechanism E1 may be a one-way clutch E1 which may be closed so that torque to the rear hub 80 is supplied by the motor 60. The third mechanical mechanism E3 may be a one-way clutch which may be open, disconnecting the chain ring CR from receiving torque from the rear hub 80 to reduce spin losses when coasting.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include an electric cycle powertrain having a first planetary gear set and a second planetary gear set, wherein the second planetary gear set is constructed and arranged to selectively overdrive a pedal cadence and wherein the first planetary gear set is constructed and arranged to selectively provide additional gear ratio for a motor.

Variation 2 may include an electric cycle powertrain as set forth in Variation 1 further comprising a motor, and wherein the first planetary gear set and the second planetary gear set are located within the motor allowing for the motor to be efficiently cooled.

Variation 3 may include an electric cycle powertrain as set forth in Variation 2 further comprising a battery assembly located adjacent to the motor and which is operatively connected to the motor to send energy to the motor de-coupling heat transfer between the motor and the battery assembly and allowing for the battery assembly to be efficiently cooled.

Variation 4 may include an electric cycle powertrain as set forth in any of Variations 1-3 further comprising a means for measuring torque operatively connected to the second planetary gear set and which is constructed and arranged to measure a reaction torque from a pedal input at a grounded element of the second planetary gear set.

Variation 5 may include an electric cycle powertrain as set forth in Variation 4 wherein the means for measuring torque is constructed and arranged to control operation of at least one of the motor or a regenerative braking system.

Variation 6 may include an electric cycle powertrain as set forth in any of Variations 1-5 further comprising a first pedal assembly and a second pedal assembly operatively connected to a crankshaft and the second planetary gear set; a motor, wherein the motor is operatively connected to the first planetary gear set to selectively rotate the crankshaft; a chain ring operatively connected to the crankshaft; a chain operatively connected to the chain ring; a rear sprocket operatively connected to the chain and a rear hub; and a rear wheel operatively connected to the rear hub.

Variation 7 may include an electric cycle powertrain as set forth in any of Variations 1-6 further comprising at least one of a first mechanical mechanism operatively connected to the first pedal assembly and the second pedal assembly, a second mechanical mechanism operatively connected to the second planetary gear set, a third mechanical mechanism operatively connected to the chain ring, and a fourth mechanical mechanism operatively connected to the rear hub.

Variation 8 may include an electric cycle powertrain as set forth in Variation 7 wherein at least one of the first mechanical mechanism, the second mechanical mechanism, the third mechanical mechanism, and the fourth mechanical mechanism is a one-way clutch.

Variation 9 may include an electric cycle powertrain as set forth in any of Variations 7-8 wherein the first mechanical mechanism is constructed and arranged so that when the first mechanical mechanism is open, the crankshaft is rotated by rotation of at least one of the first pedal assembly or the second pedal assembly and when the first mechanical mechanism is closed, the motor is rotated by the crankshaft.

Variation 10 may include an electric cycle powertrain as set forth in any of Variations 7-9 wherein the second mechanical mechanism is constructed and arranged to allow for at least one of free rotation of the first pedal assembly and the second pedal assembly in both a clockwise and a counterclockwise direction; preventing of rotation of the first pedal assembly and the second pedal assembly in both the clockwise and the counterclockwise direction; preventing of rotation of the first pedal assembly and the second pedal assembly in the clockwise direction and allowing of rotation in the counterclockwise direction; or preventing of rotation of the first pedal assembly and the second pedal assembly in the counterclockwise direction and allowing of rotation in the clockwise direction.

Variation 11 may include an electric cycle powertrain as set forth in any of Variations 7-10 wherein the third mechanical mechanism is constructed and arranged so that when the third mechanical mechanism is closed, torque from the crankshaft and the motor are transferred to the chain ring, and when the third mechanical mechanism is open, the chain ring is disconnected from the crankshaft and the motor.

Variation 12 may include an electric cycle powertrain as set forth in any of Variations 7-11 wherein the fourth mechanical mechanism is constructed and arranged so that when the fourth mechanical mechanism is closed, the rear hub is operatively connected to the rear sprocket to receive torque from the rear sprocket and when the fourth mechanical mechanism is open, the rear hub is disconnected from the rear sprocket allowing the rear hub to coast freely.

Variation 13 may include an electric cycle powertrain as set forth in any of Variations 1-12 further comprising a spring operatively connected to the second planetary gear set which is constructed and arranged to absorb static abuse and to provide a rider with proportional feel when a second mechanical mechanism locks a first pedal assembly and a second pedal assembly from rotation.

Variation 14 may include an electric cycle powertrain as set forth in any of Variations 1-13 wherein the electric cycle powertrain is constructed and arranged to selectively operate in at least one of a pedal assist mode, a coast with spinning motor synchronized with the road mode, a coast without spinning motor synchronized with the road mode, an electronic coaster/regeneration mode, a regeneration mode, a pedal throttle mode, a pedal mode without back drive lockup mode, or a security lock mode.

Variation 15 may include an electric cycle comprising: a crankshaft; a first pedal assembly and a second pedal assembly operatively connected to the crankshaft; a chain ring operatively connected to the crankshaft; a chain operatively connected to the chain ring; a rear sprocket operatively connected to the chain and a rear hub; a motor comprising a stator and a rotor operatively connected to the crankshaft; a battery pack adjacent to and operatively connected to the motor; a first planetary gear set operatively connected to the motor, wherein the first planetary gear set is constructed and arranged to selectively provide additional gear ratio for the motor; and a second planetary gear set operatively connected to the first pedal assembly and the second pedal assembly, and wherein the second planetary gear set is constructed and arranged to selectively overdrive a pedal cadence.

Variation 16 may include an electric cycle as set forth in Variation 15 wherein the first planetary gear set comprises a grounded first ring gear, a first sun gear operatively attached to one or more first planetary gears to rotate the first planetary gears within the first ring gear, a first carrier operatively connected to the one or more planetary gears which rotates with the planetary gears and wherein the carrier is operatively connected to the chain ring and wherein the first sun gear is operatively attached to the rotor and may be driven by the motor; and wherein the second planetary gear set comprises a second grounded ring gear, a second sun gear operatively attached to one or more second planetary gears to rotate the one or more second planetary gears within the second ring gear, a second carrier operatively connected to the one or more second planetary gears which rotates with the second planetary gears, and wherein the second carrier is operatively connected to the crankshaft.

Variation 17 may include an electric cycle as set forth in any of Variations 15-16 further comprising at least one of a first mechanical mechanism operatively attached to the first and the second pedal assemblies constructed and arranged so that when the first mechanical mechanism is closed, torque to the rear sprocket is provided by at least one of the motor or the first and second pedal assemblies, and when the first mechanical mechanism is open, torque to the rear sprocket is provided by the motor; a second mechanical mechanism operatively connected to the second sun gear, wherein the second mechanical mechanism is constructed and arranged to selectively provide for at least one of: free rotation of the first pedal assembly and the second pedal assembly in both the clockwise and counterclockwise directions; locking the first pedal assembly and the second pedal assembly in both the clockwise and counterclockwise directions; locking the first pedal assembly and the second pedal assembly in the clockwise direction only; or locking the first pedal assembly and the second pedal assembly in the counterclockwise direction only; a third mechanical mechanism operatively connected to the chain ring constructed and arranged so that when the third mechanical mechanism is closed, torque from the crankshaft or the motor is transferred to the chain ring and when the third mechanical mechanism is open, the chain ring is disconnected from the crankshaft and the motor; or a fourth mechanical mechanism operatively attached to the rear hub constructed and arranged so that when the fourth mechanical mechanism is closed, the rear hub may be operatively connected to the rear sprocket and when the fourth mechanical mechanism is open, the rear hub is disconnected from the rear sprocket.

Variation 18 may include an electric cycle as set forth in any of Variations 15-17 further comprising a means for measuring torque operatively connected to the second planetary gear set constructed and arranged to measure a reaction torque from pedaling or a direct crankshaft torque when a second mechanical mechanism is locked.

Variation 19 may include an electric cycle as set forth in Variation 18 wherein the means for measuring torque is a strain gage attached to the second ring gear and which is constructed and arranged to measure a reaction torque of the second ring gear to control at least one of an operation of the motor or a regenerative braking system in the motor.

Variation 20 may include an electric cycle as set forth in any of Variations 15-19 wherein the electric cycle is constructed and arranged to selectively operate in at least one of a pedal assist mode, a coast with spinning motor synchronized with the road mode, a coast without spinning motor synchronized with the road mode, an electronic coaster/regeneration mode, a regeneration mode, a pedal throttle mode, a pedal mode without back drive lockup mode, or a security lock mode.

Variation 21 may include an electric cycle powertrain comprising a motor and at least one gear set, wherein the at least one gear set is constructed and arranged to be located within the motor to allow the motor to be efficiently cooled.

Variation 22 may include an electric cycle powertrain as set forth in Variation 21 further comprising a battery assembly located adjacent to the motor and which is operatively connected to the motor to send energy to the motor de-coupling heat transfer between the motor and the battery assembly and allowing for the battery assembly to be efficiently cooled.

The above description of select variations within the scope of the invention is merely illustrative in nature and, thus, variations or variants thereof are not to be regarded as a departure from the spirit and scope of the invention.

What is claimed is:

1. An electric cycle powertrain having a motor, a first planetary gear set and a second planetary gear set, wherein the second planetary gear set is operatively attached to a crank assembly and is constructed and arranged to selectively overdrive a pedal cadence and wherein the first planetary gear set is operatively attached to the motor and is constructed and arranged to selectively provide additional gear ratio for the motor, and wherein the first planetary gear set and the second planetary gear set are located within the motor.

2. The electric cycle powertrain of claim 1 further comprising the motor, and wherein the first planetary gear set and the second planetary gear set are located within the motor allowing for the motor to be efficiently cooled.

3. The electric cycle powertrain of claim 2 further comprising a battery assembly located adjacent to the motor and which is operatively connected to the motor to send energy to the motor de-coupling heat transfer between the motor and the battery assembly and allowing for the battery assembly to be efficiently cooled.

4. The electric cycle powertrain of claim 1 further comprising a strain gage operatively connected to the second planetary gear set and which is constructed and arranged to measure a reaction torque from a pedal input at a grounded element of the second planetary gear set.

5. The electric cycle powertrain of claim 4 wherein the strain gage is constructed and arranged to control operation of at least one of the motor or a regenerative braking system.

6. The electric cycle powertrain of claim 1 further comprising a first pedal assembly and a second pedal assembly operatively connected to a crankshaft and the second planetary gear set; the motor, wherein the motor is operatively connected to the first planetary gear set to selectively rotate the crankshaft; a chain ring operatively connected to the crankshaft; a chain operatively connected to the chain ring; a rear sprocket operatively connected to the chain and a rear hub; and a rear wheel operatively connected to the rear hub.

7. The electric cycle powertrain of claim 6 further comprising at least one of a first mechanical mechanism operatively connected to the first pedal assembly and the second pedal assembly, a second mechanical mechanism operatively connected to the second planetary gear set, a third mechanical mechanism operatively connected to the chain ring, and a fourth mechanical mechanism operatively connected to the rear hub.

8. The electric cycle powertrain of claim 7 wherein at least one of the first mechanical mechanism, the second mechanical mechanism, the third mechanical mechanism, and the fourth mechanical mechanism is a one-way clutch.

9. The electric cycle powertrain of claim 7 wherein the first mechanical mechanism is constructed and arranged so that when the first mechanical mechanism is closed, torque to the rear hub is generated by rotation of at least one of the first pedal assembly or the second pedal assembly and when the first mechanical mechanism is opened, the torque to the rear hub comes from the motor.

10. The electric cycle powertrain of claim 7 wherein the second mechanical mechanism is constructed and arranged to allow for at least one of free rotation of the first pedal assembly and the second pedal assembly in both a clockwise and a counterclockwise direction; preventing of rotation of the first pedal assembly and the second pedal assembly in both the clockwise and the counterclockwise direction; preventing of rotation of the first pedal assembly and the second pedal assembly in the clockwise direction and allowing of rotation in the counterclockwise direction; or preventing of rotation of the first pedal assembly and the second pedal assembly in the counterclockwise direction and allowing of rotation in the clockwise direction.

11. The electric cycle powertrain of claim 7 wherein the third mechanical mechanism is constructed and arranged so that when the third mechanical mechanism is closed, torque from the crankshaft and the motor are transferred to the chain ring, and when the third mechanical mechanism is open, the chain ring is disconnected from the crankshaft and the motor.

12. The electric cycle powertrain of claim 7 wherein the fourth mechanical mechanism is constructed and arranged so that when the fourth mechanical mechanism is closed, the rear hub is operatively connected to the rear sprocket to receive torque from the rear sprocket and when the fourth mechanical mechanism is open, the rear hub is disconnected from the rear sprocket allowing the rear hub to coast freely.

13. The electric cycle powertrain of claim 1 further comprising a spring operatively connected to the second planetary gear set.

14. The electric cycle powertrain of claim 7 wherein the electric cycle powertrain is constructed and arranged to selectively operate in at least one of a pedal assist mode, a coast with spinning motor synchronized with a road mode, a coast without spinning motor synchronized with the road mode, an electronic coaster/regeneration mode, a regeneration mode, a pedal throttle mode, a pedal mode without back drive lockup mode, or a security lock mode.

15. An electric cycle comprising:
a crankshaft;
a first pedal assembly and a second pedal assembly operatively connected to the crankshaft;
a chain ring operatively connected to the crankshaft;
a chain operatively connected to the chain ring;
a rear sprocket operatively connected to the chain and a rear hub;
a motor comprising a stator and a rotor operatively connected to the crankshaft;
a battery pack adjacent to and operatively connected to the motor;
a first planetary gear set operatively connected to the motor and positioned within the motor, wherein the first planetary gear set is constructed and arranged to selectively provide additional gear ratio for the motor; and
a second planetary gear set operatively connected to the first pedal assembly and the second pedal assembly and positioned within the motor, and wherein the second planetary gear set is constructed and arranged to selectively overdrive a pedal cadence.

16. The electric cycle of claim 15 wherein the first planetary gear set comprises a grounded first ring gear, a first sun gear operatively attached to one or more first planetary gears to rotate the first planetary gears within the first ring gear, a first carrier operatively connected to the one or more planetary gears which rotates with the planetary gears and wherein the carrier is operatively connected to the chain ring and wherein the first sun gear is operatively attached to the rotor and is driven by the motor; and wherein the second planetary gear set comprises a second grounded ring gear, a second carrier operatively attached to one or more second planetary gears to rotate the one or more second planetary gears within the second ring gear, a second sun gear operatively connected to the one or more second planetary gears which rotates with the second planetary gears, and wherein the second carrier is operatively connected to the crankshaft.

17. The electric cycle of claim 16 further comprising at least one of:
a first mechanical mechanism operatively attached to the first and the second pedal assemblies constructed and arranged so that when the first mechanical mechanism is closed, torque to the rear sprocket is provided by at least one of the motor or the first and second pedal assemblies, and when the first mechanical mechanism is open, torque to the rear sprocket is provided by the motor;
a second mechanical mechanism operatively connected to the second sun gear, wherein the second mechanical mechanism is constructed and arranged to selectively provide for at least one of free rotation of the first pedal assembly and the second pedal assembly in both the clockwise and counterclockwise directions; locking the first pedal assembly and the second pedal assembly in both the clockwise and counterclockwise directions; locking the first pedal assembly and the second pedal assembly in the clockwise direction only; or locking the first pedal assembly and the second pedal assembly in the counterclockwise direction only;

a third mechanical mechanism operatively connected to the chain ring constructed and arranged so that when the third mechanical mechanism is closed, torque from the crankshaft or the motor is transferred to the chain ring and when the third mechanical mechanism is open, the chain ring is disconnected from the crankshaft and the motor; or a fourth mechanical mechanism operatively attached to the rear hub constructed and arranged so that when the fourth mechanical mechanism is closed, the rear hub is operatively connected to the rear sprocket and when the fourth mechanical mechanism is open, the rear hub is disconnected from the rear sprocket.

18. The electric cycle of claim 16 further comprising a strain gage operatively connected to the second planetary gear set constructed and arranged to measure a reaction torque from pedaling or a direct crankshaft torque when a second mechanical mechanism is locked.

19. The electric cycle of claim 18 wherein the strain gage is attached to the second ring gear and is constructed and arranged to measure a reaction torque of the second ring gear to control at least one of an operation of the motor or a regenerative braking system in the motor.

20. The electric cycle of claim 15 wherein the electric cycle is constructed and arranged to selectively operate in at least one of a pedal assist mode, a coast with spinning motor synchronized with a road mode, a coast without spinning motor synchronized with the road mode, an electronic coaster/regeneration mode, a regeneration mode, a pedal throttle mode, a pedal mode without back drive lockup mode, or a security lock mode.

* * * * *